3,598,532
**MEANS AND METHOD FOR CRUCIBLE
LEAK DETECTION**
Irving Adams, Cranford, N.J., and Richard F. Friedrich,
 Brooklyn, N.Y., assignors to Loral Corporation, Scarsdale, N.Y.
Filed Nov. 29, 1968, Ser. No. 786,809
Int. Cl. B01d *39/14;* G01m *3/04;* G01n *33/20*
U.S. Cl. 23—230                                    2 Claims

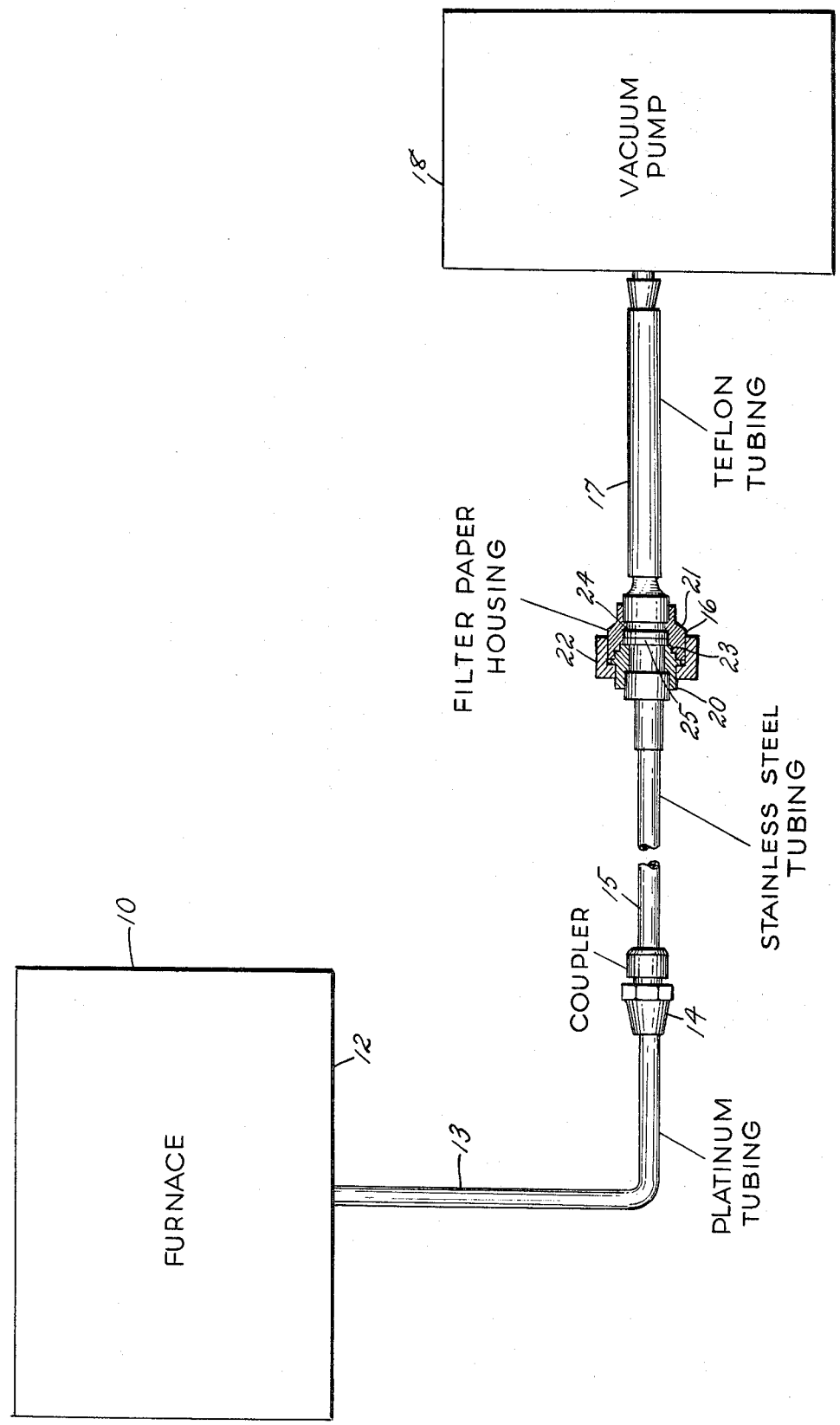

ABSTRACT OF THE DISCLOSURE

Means and method for detecting leaks in platinum crucibles during the period of crystal growth in the manufacture of synthetic chemical structures using a solvent such as lead oxide and/or lead fluoride. Leaks are detected by sampling small quantities of air in the furnace, and testing for the presence of lead or other solvents. The lead particles are trapped on a disc of filter paper, and detected by means of a chemical reaction which changes the lead to a black deposit of lead sulphide. Other elements are detected by spectroscopic methods.

---

This invention relates generally to the field of synthetic crystal growth by precipitation of a solution of the desired compositions from a molten solvent such as lead oxide and/or lead fluoride.

The disclosed structure may also be used where the solvent is a barium, boron or bismuth compound, or other solvent, rather than lead oxide or lead fluoride, in which case the leak must be detected by spectroscopic analysis of the deposit on the filter paper or other suitable method.

In the growth of crystals using a molten salt method, it is customary to provide a small platinum crucible of several inches in diameter, in which the solute and solvent are placed. The crucible may be sealed or capped, and placed in an electric furnace where it is heated from a time ranging about two weeks to about two months, during which time the molten salt is cooled gradually to a temperature where the solute will precipitate in crystalline form, to be subsequently removed when the crucible has been cooled.

It is important that any leak in the crucible during the heating period be detected as soon as possible, because of the potential damage the molten flux may cause to the furnace, as well as the time lost when the crucible has leaked early in the cycle, and is finally removed empty at the end of a long heating period.

It is therefore among the principal objects of the present invention to provide a means and method whereby the above mentioned leakage may be conveniently detected without the necessity of waiting until the end of the run before the presence of an actual leak is determined.

Another object of the invention lies in the provision of means for sampling the air in the furnace surrounding the crucible at convenient intervals for the detection of the presence of volatilized solvent.

A further object of the invention lies in the provision of improved means of the class described which may be conveniently incorporated into existing furnaces without extensive modification.

A feature of the invention lies in the fact that the presence of escaping solvent may be conveniently detected by visual observation, after manually reacting condensed gas solvent. When the crucible is not sealed but closed by means of a cover or cap, the leak is determined by the unusual level of solvent evaporation which is several times as great when a leak has occurred than when only normal evaporation occurs. In addition the filter may consist of other means than filter paper i.e. a cold trap consisting of liquid $N_2$ could be used to trap the evaporating solvent.

These objects and features, as well as other incidental ends and advantages, will more fully appear in the progress of the following disclosure, and be pointed out in the appended claims.

In the drawing, the single figure is a schematic view of an embodiment of the invention.

In a typical crystal growth operation, which is mentioned by way of example only, as it will be readily understood by those skilled in the art that the invention has application to other types of crystal growth as well, it is known to grow yttrium-iron-garnet crystals, by precipitating the same from a molten lead oxide or lead fluoride solvent. In the customary procedure, the mixture is heated in a platinum crucible approximately three inches in diameter and three inches deep which has been sealed or capped, to a temperature of approximately 1300 degrees C. Over a period of approximately one month, it is gradually cooled to 1000 degrees C., precipitation commencing normally at around 1200 degrees C. Should the crucible leak, it is most convenient to detect the presence of escaping solvent, and by sampling the ambient air within the furnace for the presence of lead, detection is conveniently accomplished.

With reference to the accompanying drawing, a furnace 10 contains a crucible (not shown) and is of conventional design. Connected to a side wall 12 thereof is a length of platinum tubing 13, in turn interconnected by a coupling device 14 to a length of stainless steel tubing 15. The opposite end of the tubing 15 is in turn connected to a filter paper housing element 16. Teflon tubing 17 connects the housing 16 with a vacuum pump 18, or other source of suction.

The filter paper housing element 16 may be of any desired type, preferably including a male member 20 engaging a female member 21 and maintained in connected position by a threaded collar 22. A recess 23 accommodates a pair of clamp members 24 and 25 sandwiching a circular disc of filter paper (not shown) therebetween.

Should a leak occur during the heating cycle, air surrounding the crucible will contain excessively large quantities of vaporized lead oxide or lead fluoride. By the time the vapor has reached the filter paper housing element 16, it has condensed, and will be trapped on the filter paper as a fine powdered deposit, normally not visible to the naked eye. Both lead oxide and lead fluoride will react in the presence of a few drops of ammonium polysulphide which will immediately form a lead sulphide of blackish color, thus indicating the presence of a leak. To accomplish this, it is necessary only to disassemble the filter housing, and remove the filter paper.

The test for the detection of leakage may be conducted as often as deemed necessary, based upon previous empirical results.

We claim:
1. In the method of growing synthetic crystals by the precipitation of the same from molten salts during continuous heating thereof in a crucible, the method of de- tecting leakage of said crucible while disposed within a furnace comprising the steps of: periodically withdrawing samples of ambient air from said furnace in the area surrounding said crucible, filtering said air while at a temperature sufficiently low to condense any escaping solvent from vapor to solid form, and subjecting said condensed solvent to a chemical reaction to render the same visually detectable.

2. The method in accordance with claim 1, in which the molten salt is a lead composition from the group consisting of lead oxide and lead fluoride, and reacting said condensed solvent with ammonium polysulfide.

References Cited

UNITED STATES PATENTS 1,508,367   9/1924   Matlock _____ 55—267X

MORRIS O. WOLK, Primary Examiner

R. M. REESE, Assistant Examiner

U.S. Cl. X.R.

23—253; 55—269, 270, 385, 503; 73—40.7